Figure 1:
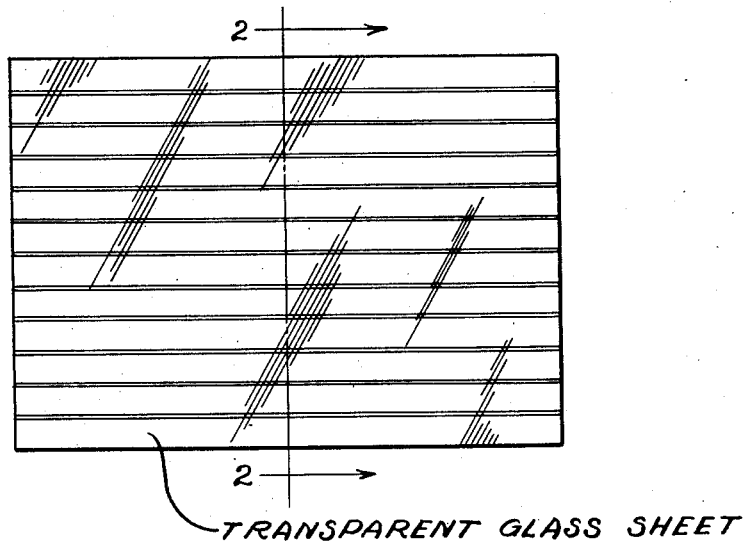

July 18, 1950  S. D. STOOKEY  2,515,943
PHOTOSENSITIVE GLASS ARTICLE AND COMPOSITION
AND METHOD FOR MAKING IT
Filed Jan. 7, 1949

TRANSPARENT GLASS SHEET

LINEAR OPACIFIED STRIPS

INVENTOR.
STANLEY DONALD STOOKEY
BY
Rolf E. Schneider
ATTORNEY

Patented July 18, 1950

2,515,943

UNITED STATES PATENT OFFICE 2,515,943

PHOTOSENSITIVE GLASS ARTICLE AND COMPOSITION AND METHOD FOR MAKING IT

Stanley Donald Stookey, Corning, N. Y., assignor to Corning Glass Works, Corning, N. Y., a corporation of New York Application January 7, 1949, Serial No. 69,769

20 Claims. (Cl. 49—88)

This invention relates to photosensitive glasses, that is, glasses in which exposure to short-wave radiations, such as ultraviolet radiations, brings about an invisible change in the glass as a result of which irradiated areas are capable of heat-developed coloration while non-irradiated areas remain substantially unchanged on heating.

In my pending application, Serial No. 513,443, filed December 8, 1943, I have disclosed photosensitive glass articles and compositions therefor which contain up to 0.05% $CeO_2$ and 0.01% to 0.03% of gold as sensitizing agent. Such glasses are initially colorless and transparent, but when irradiated with ultraviolet radiations and subsequently heated uniformly at temperatures just below their softening points, they become colored by the gold only where irradiated and the non-irradiated portions remain colorless and unchanged.

In another pending application, Serial No. 513,445, filed December 8, 1943, I have disclosed similar colorless transparent photosensitive glasses which additionally contain sufficient fluorine to cause them, independent of irradiation, to become uniformly opacified throughout when subsequently heated, thereby providing glass articles which, after irradiation and heat treatment, have colored areas or images on colorless, opaque, white backgrounds.

After extensive researches I have now discovered gold-containing photosensitive glass compositions which are initially colorless and transparent, but which, after being irradiated in the usual manner and thereafter uniformly heat treated in the particular manner hereinafter described, become opacified only in those areas which were irradiated while the non-irradiated areas remain clear and transparent. That is to say, in the new glasses opacification is effected only by irradiation and subsequent heat treatment. By means of the new compositions and methods, it has now become possible to produce glass articles containing photographic images or designs wherein the images alone are opacified and appear opaque, white or translucent as distinguished from the prior articles, described in my application Serial No. 513,445, in which colored images are superposed against an opaque, white or translucent background. Such opacified images exhibit fine details and shadow effects equal in all respects to those produced in other photographic media, and even surpassing them in some respects.

The new glasses, on the oxide basis, contain 55% to 75% $SiO_2$, 12% to 18% $Na_2O$, 2% to 12% $Al_2O_3$, 0% to 5% $B_2O_3$, 0% to 3% individually and collectively of an oxide selected from the group consisting of BeO, MgO and CaO, 0% to 10% ZnO, 0% to 10% BaO, the amount of ZnO plus BaO not exceeding 10%, at least 0.001% but less than 0.01% of gold computed as Au, 0.005% to 0.05% $CeO_2$, 0% to 0.2% $Sb_2O_3$, and 1.8% to 2.4% of analytically determined fluorine.

The base glass, exclusive of the photosensitizing agents and opacifier, comprises silica, alkali metal oxide and alumina in amounts within the indicated ranges of proportions. The use of these three ingredients outside of such ranges results in an unsatisfactory product. Too much $SiO_2$ or too little $Na_2O$ hardens the glass objectionably and tends to destroy its photosensitivity by causing opacification throughout when heated. On the other hand, too little $SiO_2$ results in a tendency towards chemical instability of the glass, corrosive attack on the refractories and coloration of the glass throughout on heating while too much $Na_2O$ prevents opacification of the latent image. Too much $Al_2O_3$ causes objectionable hardening of the glass and a deficiency of $Al_2O_3$ prevents opacification of the latent image on heating.

Although it is preferred to employ only $Na_2O$ as the alkali metal oxide, either $K_2O$ or $Li_2O$ or both may be substituted in part for the $Na_2O$ but not in amounts sufficient to cause the glass to become too hard or unstable.

If desired, boric oxide in small amounts not exceeding about 5% may be introduced into the new glasses. More than this amount causes excessive softening of the glass since the alkali metal oxide content must not be decreased below 12%. Also, boric oxide in larger amounts tends to weaken the photosensitivity of the glass.

Although a base glass exclusively containing silica, alkali metal oxide, and alumina is to be preferred, oxides of the indicated metals of the second periodic group within the specified limits may be included if desired. When present, BeO, MgO, or CaO should not exceed 3%, either individually or collectively, because more than this amount induces the development of opacity throughout the glass, independent of irradiation or, in other words, destroys the desired photosensitive characteristic of the glass. For the same reason, the oxides of zinc or barium, if present, should not exceed 10% individually and collectively.

It is essential that the addition of elements and oxides which cause the glass to absorb ultraviolet radiations be avoided. Such absorptive constituents include most elements and oxides which color glass, particularly selenium or its compounds and oxides of iron, copper, uranium, vanadium, and manganese, as well as the non-coloring oxides of arsenic, thallium and lead. Cerium oxide in excess of the amount specified above is also to be avoided for the same reason.

The gold may be introduced into the batch as any salt or compound of gold. Preferably, it is introduced by dissolving metallic gold in aqua regia to form a solution containing chlorauric acid corresponding to a given amount of gold per unit of solution, say 10 grams of gold per 100 cc., and adding a measured amount of the solution to the batch. Less than 0.001% of gold computed as Au is insufficient to produce a photosensitive effect in the glass. More than about 0.01% of gold computed as Au causes coloration of the glass when and where it is irradiated and heated. White or uncolored opacified images can be produced only with amounts of gold between 0.001% and 0.01%.

The presence of $CeO_2$ is necessary in order to promote and enhance the action of the gold in initiating a differential opacification of the glass under the influence of irradiation and heat. From 0.005% to 0.05% $CeO_2$ is required, less than this amount being ineffective and more than this amount causing sufficient absorption of ultraviolet or other effective radiations to destroy the photosensitivity of the glass. The $CeO_2$ may be added to the batch as any salt or compound of cerium, which preferably should be substantially free from other rare earths. A material satisfactory for the purpose is that known as "cerium hydrate" which has a content of cerium equivalent to 75% $CeO_2$.

The presence of $Sb_2O_3$, although not essential, is quite advantageous because it increases the heat sensitivity of the irradiated glass, that is, the facility and celerity with which development of the image by heat treatment can be brought about. In other words, for a given gold content and a given irradiation, development of the image occurs at a lower temperature or in a shorter time of heating when $Sb_2O_3$ is present than when it is absent. Conversely, for a given time and temperature of heat treatment, the time or intensity of irradiation or even the gold content may be decreased when $Sb_2O_3$ is present. Amounts in excess of 0.2% $Sb_2O_3$ tend to cause overall coloration of the glass by the gold on heating, independent of irradiation, and hence decrease or destroy the photosensitivity. In addition to these effects, $Sb_2O_3$ also exerts a fining action on the glass whereby bubbles and seeds are more readily eliminated during melting, as described in another pending application of mine, Serial No. 1,492, filed January 9, 1948.

The amount of fluorine which is incorporated into the glass must be insufficient to cause opacification of the resulting glass when the latter is reheated. The fluorine may be introduced into the batch as any of its common compounds, such as sodium- or potassium-silicofluoride, cryolite, or alkali metal fluoride. A considerable amount of fluorine is unavoidably lost by volatilization in the melting of a batch containing a substantial quantity of a fluorine compound, the size of which loss will vary depending upon the time and temperature of melting and the type of melting container, that is, whether open or closed, and it is therefore impossible to state a definite amount of fluorine which, when introduced into the batches of the present glasses, will produce the desired result under all conditions. However, I have determined that the amount of fluorine remaining in the final glass, that is, analytically determined fluorine, must fall within the specified limits of 1.8% to 2.4% to produce the present result, regardless of the quantity of fluorine introduced with the batch. Glasses having fluorine contents outside of these limits are ineffective for my purpose.

In what form the flourine exists in the unopacified glass is not definitely known, but it is believed that at least some of it is in the form of alkali metal fluoride dissolved in the glass. In any event, it has been determined that the opacifying crystallites in the final glass are composed largely, if not entirely, of alkali metal fluoride, and in particular sodium fluoride.

The following batches are illustrative of glass compositions falling within the scope of my invention (weights in grams except the gold solution, which is expressed in cubic centimeters):

|  | 1 | 2 | 3 | 4 | 5 | 6 | 7 | 8 |
|---|---|---|---|---|---|---|---|---|
| Sand | 1,000 | 1,000 | 1,000 | 1,000 | 1,000 | 1,000 | 1,000 | 1,000 |
| $Na_2CO_3$ | 346 | 265 | 294 | 378 | 383 | 229 | 249 | 311 |
| $NaNO_3$ | 39 | 41 | 82 | 93 | 41 | 41 | 40 | 90 |
| $Al(OH)_3$ | 225 | 100 | 240 | 271 | 209 | 144 | 86 | 262 |
| Borax | 22 | 38 | 23 | 30 |  | 79 | 77 | 26 |
| $CaCO_3$ |  |  | 53 |  |  | 26 |  |  |
| $BaCO_3$ |  | 211 | 137 | 155 |  | 158 |  | 150 |
| ZnO |  |  |  |  |  |  | 144 |  |
| Gold Solution (10% Au) in cc. | 0.3 | 0.6 | 0.6 | 0.8 | 0.7 | 0.9 | 0.9 | 0.9 |
| Cerium Hydrate (75% $CeO_2$) | 0.22 | 0.24 | 0.24 | 0.25 | 0.25 | 0.3 | 0.3 | 0.48 |
| $Sb_2O_3$ | 1.37 | 1.2 | 1.2 |  |  | 0.6 | 0.6 | 1.28 |
| NaCl | 3 |  |  |  |  |  |  |  |
| $Na_2SiF_6$ | 72 | 62 | 73 | 96 |  | 59 | 57 | 83 |
| $Na_3AlF_6$ |  |  |  |  | 88 |  |  |  |

The gold solution is prepared by dissolving metallic gold in aqua regia in the proportions of 10 grams of gold per 100 cc. of solution. The $NaNO_3$ in each of these batches serves as an oxidizing agent and its presence insures melting under oxidizing conditions. The presence of a small amount of NaCl, as in batch No. 1, is believed to facilitate the crystallization of sodium fluoride, but satisfactory results can be obtained without it. These batches are suitable for melting in open pots or tank furnaces. Batch No. 1 is particularly desirable from an economic point of view.

As is well known, the exact compositions of fluorine-containing glasses cannot be calculated with accuracy from their batches. In the first place, as pointed out above, considerable fluorine in variable amounts is lost during melting and the exact fluorine content of the final glass can be determined only by analysis. Moreover, fluorine is an anion, but with which cation or cations it is combined is not definitely known. The calculated final content of fluorine computed as F is therefore independent of the base composition, which is always computed on the oxide basis.

For practical purposes, the calculated percentages of the oxides and the calculated percentage of the fluorine per se are generally, as here, computed together to a total of 100%, although this results in a slight error in the expressed amounts of the various constituents as compared to their analytical amounts. The calculated compositions of such glasses are therefore approximate.

The composition calculated from batch No. 1 is 69.8% $SiO_2$, 16.6% $Na_2O$, 10.1% $Al_2O_3$, 0.5% $B_2O_3$, 0.002% Au, 0.01% $CeO_2$, 0.09% $Sb_2O_3$, and 2.9% F. In comparison with this, the analytical fluorine content of a 1500 lb. melt of batch No. 1, melted in a small tank furnace at 1380° C. for 10 hours and cooled to 1200° C. in another 10 hours before working, was 2.27% F. The recalculated composition of batch No. 1 is then approximately 70.2% $SiO_2$, 16.7% $Na_2O$, 10.2% $Al_2O_3$, 0.5% $B_2O_3$, 0.002% Au, 0.01% $CeO_2$, 0.09% $Sb_2O_3$, and 2.27% F. The physical properties of such glass were: softening point 651° C., annealing point 460° C., strain point 429° C., and thermal expansion coefficient $83.7 \times 10^{-7}$ cm. per cm. per °C. between 0° and 300° C. (Softening, annealing, and strain points are defined in an article entitled "Viscosity of Glass between the Strain Point and Melting Temperature," by H. R. Lillie, Jour. Am. Cer. Soc., vol. 14, p. 502 (1931).)

The glasses falling within the scope of this invention are colorless and transparent and will so remain when merely reheated. When such glasses are irradiated with short-wave radiations, no visible change occurs but, when subsequently heat treated in the manner to be described, the irradiated areas become opacified while non-irradiated areas remain colorless and transparent. If, during irradiation, a photographic negative or stencil is interposed between the glass and the source of radiation in the conventional manner, an opacified white photographic image or design will be formed in the glass during the subsequent reheating.

The time required for a suitable irradiation may vary from about one or two minutes to an hour or more, depending upon the intensity of the light source and its distance from the glass. Using a 60-ampere carbon arc at a distance of 12 inches, I have found that an average irradiation can be accomplished in 15 minutes. With lower light intensities and/or greater distances, longer times are required. On the contrary, higher intensities or shorter distances require less time. As in the conventional photographic process, the interposition between the light source and the glass of a photographic negative having high lights and low lights results in a definite and predetermined variation in the intensity of the effective radiations falling on the glass and a corresponding variation in the latent image which is formed in the glass.

After the glass has been irradiated it is heated for a time ranging from five minutes to six hours at a temperature within the range extending from 100° C. below the softening point of the glass up to 50° C. above the softening point. Unless it is desired to alter the shape of the glass, as in curving flat sheets, however, the glass should not be heated above its softening point. The time and temperature of heating are interdependent, the time being a logarithmic function of the temperature and becoming less as the temperature is increased. Too rapid heating of the glass above 500° C. tends to nullify the effect of the preceding irradiation and to erase the latent image. Therefore, the heating kiln should not be preheated above 500° C. As illustrative, with a glass sheet made from batch No. 1 which has received an average exposure as noted above, a satisfactory schedule comprises heating it in an electrically heated kiln from room temperature to 650° C. at the full heating rate of the kiln and then holding the kiln at 650° C. for twenty minutes. The same result may be obtained by heating it to 580° C. and holding it at the latter temperature for two hours.

The heat treatment described above is a preliminary but essential step for the ultimate development of the latent image. It does not cause any opacification in any of the glasses of this invention nor any visible change therein unless the gold and antimony oxide contents of the glass are at or near their maximum values. In that case, the latent image may, as the result of such heating, develop into a real image which tends toward pink tint but is otherwise transparent. It is believed that during such heat treatment submicroscopic nuclei of colloidal gold are formed only in the irradiated portions of the glass and in proportion to the time and intensity of the irradiation. It is further believed that if the gold and antimony oxide contents of the glass are sufficiently great, the gold nuclei will be of a size and numbers sufficient to tend to cause a pinkish coloration of the glass, as noted above. The glass from batch No. 1, for example, remains colorless and visibly unchanged by the foregoing heat treatment.

Following such preliminary heat treatment, the glass is cooled to a temperature below 520° C. During this step also, no further visible change in the glass occurs. It is believed that submicroscopic nuclei of the opacifying agent or agents, that is, alkali metal fluorides, are formed on the gold nuclei as a result of this cooling, and that the formation of such invisible fluoride nuclei is entirely dependent upon the presence of the gold nuclei without which opacification of the latent image could not be initiated. Approximately 520° C. appears to be the nucleation temperature of sodium fluoride because the glasses must be cooled to below this temperature, but how much below seems to be immaterial and they may be cooled to room temperature if desired.

Having been so cooled, the glass is again heated for a time and at a temperature sufficient to cause the fluoride nuclei to grow and form opacifying crystallites. For this purpose any temperature above 520° C., and preferably above 540° C. but below 700° C., may be used. At a temperature of 540° C. it is necessary to heat the glass for about one hour in order to completely develop the image in an opacified form. At a temperature of 700° C., development is complete in a few seconds. The opacifying crystallites so formed have been found to comprise sodium fluoride. The finished glass is thereafter cooled to room temperature.

It is only during this second heating that the final opacified image is developed and then only in the irradiated portions of the glass. Such image will appear white or uncolored unless the preliminary heating has caused development of a pinkish image, as described above. In the latter case, the final opacified image may appear to be pink, and for some purposes such an image may be desirable. The final image which is thus produced in the glass from batch No. 1 is opaque white.

Figure 2:
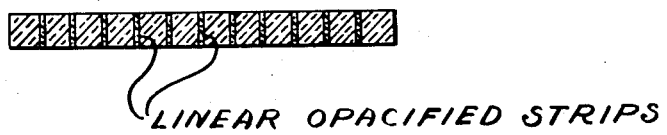

The glasses of this invention and articles made therefrom containing opacified images are useful and desirable for many purposes, both ornamental and utilitarian. Of particular use and desirability are glass sheets in which the image consists in a series of narrow, opacified, linear strips or portions extending through the sheet from one face to the other at any suitable angle to the plane thereof, as shown only by way of example in the accompanying drawing in which:

Fig. 1 is a plan view of a transparent glass sheet having linear opacified strips in accordance with my invention, the thickness of the sheet and the opacified portions being exaggerated for convenience; and Fig. 2 is a sectional view on the line 2—2 of Fig. 1.

The spaces between the opacified strips are clear and transparent, and are of such width as to render the opacified strips effective as louvers whereby light is transmitted in a direction perpendicular to the face of the sheet but is partially or completely intercepted in a direction at an angle to the face of the sheet and to the strips.

I claim:

1. A clear, transparent photosensitive glass comprising essentially 55% to 75% $SiO_2$, 12% to 18% of an alkali metal oxide selected from the group consisting of $Na_2O$, mixtures of $Na_2O$ and $K_2O$ and mixtures of $Na_2O$ and $Li_2O$, 2% to 12% $Al_2O_3$, at least 0.001% but less than 0.01% of gold computed as Au, 0.005% to 0.05% $CeO_2$, and 1.8% to 2.4% of analytically determined fluorine, the glass being capable of heat-developed opacification only when and where it is irradiated with short-wave radiations.

2. The photosensitive glass as claimed in claim 1 which includes up to 0.2% antimony oxide computed as $Sb_2O_3$.

3. A clear transparent photosensitive glass comprising essentially 55% to 75% $SiO_2$, 12% to 18% of an alkali metal oxide selected from the group consisting of $Na_2O$, mixtures of $Na_2O$ and $K_2O$, and mixtures of $Na_2O$ and $Li_2O$, 2% to 12% $Al_2O_3$, up to 5% $B_2O_3$, at least 0.001% but less than 0.01% of gold computed as Au, 0.005% to 0.05% $CeO_2$, and 1.8% to 2.4% of analytically determined fluorine, the glass being capable of heat-developed opacification only when and where it is irradiated with short-wave radiations.

4. The photosensitive glass as claimed in claim 3 which includes up to 0.2% antimony oxide computed as $Sb_2O_3$.

5. A clear transparent photosensitive glass comprising essentially 55% to 75% $SiO_2$, 12% to 18% of an alkali metal oxide selected from the group consisting of $Na_2O$, mixtures of $Na_2O$ and $K_2O$, and mixtures of $Na_2O$ and $Li_2O$, 2% to 12% $Al_2O_3$, the indicated amount of at least one metal oxide selected from the group consisting of up to 3% BeO, up to 3% MgO, up to 3% CaO, up to 3% of a mixture of a plurality of such three oxides, up to 10% ZnO, up to 10% BaO, and up to 10% of a mixture of ZnO and BaO, at least 0.001% but less than 0.01% of gold computed as Au, 0.005% to 0.05% $CeO_2$, and 1.8% to 2.4% of analytically determined fluorine, the glass being capable of heat-developed opacification only when and where it is irradiated with short-wave radiations.

6. A clear transparent photosensitive glass comprising essentially 55% to 75% $SiO_2$, 12% to 18% of an alkali metal oxide selected from the group consisting of $Na_2O$, mixtures of $Na_2O$ and $K_2O$, and mixtures of $Na_2O$ and $Li_2O$, 2% to 12% $Al_2O_3$, up to 5% $B_2O_3$, the indicated amount of at least one metal oxide selected from the group consisting of up to 3% BeO, up to 3% MgO, up to 3% CaO, up to 3% of a mixture of a plurality of such three oxides, up to 10% ZnO, up to 10% BaO, and up to 10% of a mixture of ZnO and BaO, at least 0.001% but less than 0.01% of gold computed as Au, 0.005% to 0.05% $CeO_2$, and 1.8% to 2.4% of analytically determined fluorine, the glass being capable of heat-developed opacification only when and where it is irradiated with short-wave radiations.

7. The photosensitive glass as claimed in claim 6 which includes up to 0.2% antimony oxide computed as $Sb_2O_3$.

8. A clear, transparent photosensitive glass which contains approximately 70.2% $SiO_2$, 16.7% $Na_2O$, 10.2% $Al_2O_3$, 0.5% $B_2O_3$, 0.002% of gold computed as Au, 0.01% $CeO_2$, 0.09% $Sb_2O_3$, and 2.27% of analytically determined fluorine, the glass being capable of heat-developed opacification only when and where it is irradiated with short-wave radiations.

9. An article comprising a glass body composed throughout of a glass comprising essentially 55% to 75% $SiO_2$, 12% to 18% of an alkali metal oxide selected from the group consisting of $Na_2O$, mixtures of $Na_2O$ and $K_2O$ and mixtures of $Na_2O$ and $Li_2O$, 2% to 12% $Al_2O_3$, at least 0.001% but less than 0.01% of gold computed as Au, 0.005% to 0.05% $CeO_2$, and 1.8% to 2.4% of analytically determined fluorine, selected portions of the glass containing light-diffusing crystallites of alkali metal fluoride which form a predetermined design or image, the remaining portions of the glass being transparent.

10. An article comprising a glass body composed throughout of a glass comprising essentially 55% to 75% $SiO_2$, 12% to 18% of an alkali metal oxide selected from the group consisting of $Na_2O$, mixtures of $Na_2O$ and $K_2O$, and mixtures of $Na_2O$ and $Li_2O$, 2% to 12% $Al_2O_3$, up to 5% $B_2O_3$, at least 0.001% but less than 0.01% of gold computed as Au, 0.005% to 0.05% $CeO_2$, and 1.8% to 2.4% of analytically determined fluorine, selected portions of the glass containing light-diffusing crystallites of alkali metal fluoride which form a predetermined design or image, the remaining portions of the glass being transparent.

11. The article as claimed in claim 10 in which the glass includes up to 0.2% antimony oxide computed as $Sb_2O_3$.

12. An article according to claim 11 in which the glass contains approximately 70.2% $SiO_2$, 16.7% $Na_2O$, 10.2% $Al_2O_3$, 0.5% $B_2O_3$, 0.002% of gold computed as Au, 0.01% $CeO_2$, 0.09% $Sb_2O_3$, and 2.27% of analytically determined fluorine.

13. An article comprising a glass body composed throughout of a glass comprising essentially 55% to 75% $SiO_2$, 12% to 18% of an alkali metal oxide selected from the group consisting of $Na_2O$, mixtures of $Na_2O$ and $K_2O$, and mixtures of $Na_2O$ and $Li_2O$, 2% to 12% $Al_2O_3$, up to 5% $B_2O_3$, the indicated amount of at least one metal oxide selected from the group consisting of up to 3% BeO, up to 3% MgO, up to 3% CaO, up to 3% of a mixture of a plurality of such three oxides, up to 10% ZnO, up to 10% BaO, and up to 10% of a mixture of ZnO and BaO, at least 0.001% but less than 0.01% of gold computed as Au, 0.005% to 0.05% $CeO_2$, and 1.8% to 2.4% of analytically determined fluorine, selected portions of the glass containing light-diffusing crystallites of alkali metal fluoride which form a predetermined design or image, the remaining portions of the glass being transparent.

14. The article as claimed in claim 13 in which the glass includes up to 0.2% antimony oxide computed as $Sb_2O_3$.

15. A transparent sheet composed throughout of a glass comprising essentially 55% to 75% $SiO_2$, 12% to 18% of an alkali metal oxide selected from the group consisting of $Na_2O$, mixtures of $Na_2O$ and $K_2O$ and mixtures of $Na_2O$ and $Li_2O$, 2% to 12% $Al_2O_3$, at least 0.001% but less than 0.01% of gold computed as Au, 0.005% to 0.05% $CeO_2$, and 1.8% to 2.4% of analytically determined fluorine, the sheet being characterized by linear portions containing light-diffusing crystallites of alkali metal fluoride.

16. A transparent sheet composed throughout of a glass comprising essentially 55% to 75% $SiO_2$, 12% to 18% of an alkali metal oxide selected from the group consisting of $Na_2O$, mixtures of $Na_2O$ and $K_2O$ and mixtures of $Na_2O$ and $Li_2O$, 2% to 12% $Al_2O_3$, at least 0.001% but less than 0.01% of gold computed as Au, 0.005% to 0.05% $CeO_2$, and 1.8% to 2.4% of analytically determined fluorine, the sheet being characterized by linear portions containing light-diffusing crystallites of alkali metal fluoride and which extend through the glass sheet from one face to the other.

17. The method of making a glass article containing an opaque design, which comprises melting under oxidizing conditions a batch for a clear, transparent glass comprising essentially 55% to 75% $SiO_2$, 12% to 18% of an alkali metal oxide selected from the group consisting of $Na_2O$, mixtures of $Na_2O$ and $K_2O$ and mixtures of $Na_2O$ and $Li_2O$, 2% to 12% $Al_2O_3$, at least 0.001% but less than 0.01% of gold computed as Au, 0.005% to 0.05% $CeO_2$, and 1.8% to 2.4% of analytically determined fluorine, forming the glass into an article, exposing a portion of the article to short-wave radiations, heating the exposed article from five minutes to six hours at a temperature within the range extending from 100° C. below the softening point of the glass up to 50° C. above the softening point, then cooling the article below 520° C. and reheating it at a temperature between 540° and 700° C. until the exposed portion develops the desired degree of opacity, and thereafter cooling the article to room temperature.

18. The method of making a glass article containing an opaque design, which includes the steps of exposing to short-wave radiations an article formed from a clear, transparent glass comprising essentially 55% to 75% $SiO_2$, 12% to 18% of an alkali metal oxide selected from the group consisting of $Na_2O$, mixtures of $Na_2O$ and $K_2O$ and mixtures of $Na_2O$ and $Li_2O$, 2% to 12% $Al_2O_3$, at least 0.001% but less than 0.01% of gold computed as Au, 0.005% to 0.05% $CeO_2$, and 1.8% to 2.4% of analytically determined fluorine, heating the exposed article from five minutes to six hours at a temperature within the range extending from 100° C. below the softening point of the glass up to 50° C. above the softening point, then cooling the article below 520° C. and reheating it at a temperature between 540° and 700° C. until the exposed portion develops the desired degree of opacity, and thereafter cooling the article to room temperature.

19. The method as claimed in claim 18 in which the glass includes up to 5% $B_2O_3$.

20. The method as claimed in claim 18 in which the glass includes up to 5% $B_2O_3$ and the indicated amount of at least one metal oxide selected from the group consisting of up to 3% BeO, up to 3% MgO, up to 3% CaO, up to 3% of a mixture of a plurality of such three oxides, up to 10% ZnO, up to 10% BaO, and up to 10% of a mixture of ZnO and BaO.

STANLEY DONALD STOOKEY.

REFERENCES CITED

The following references are of record in the file of this patent:

UNITED STATES PATENTS

| Number | Name | Date |
| --- | --- | --- |
| 2,049,765 | Fischer | Aug. 4, 1936 |
| 2,326,012 | Dalton | Aug. 3, 1943 |